Patented Jan. 10, 1933

1,893,992

UNITED STATES PATENT OFFICE

WALTER BIRKETT HAMILTON, OF BIRKDALE, AND THOMAS ALLEN EVANS, OF WHITE-FIELD, ENGLAND, ASSIGNORS TO ELECTRO METALLURGICAL COMPANY, OF NEW YORK, N. Y.

PRODUCTION OF METALS AND ALLOYS BY REDUCTION

No Drawing. Application filed January 18, 1930, Serial No. 421,723, and in Great Britain February 5, 1929.

This invention has reference to the production of metals and alloys by reduction and has for its object to provide an improved process by which metals and alloys can be produced from ores and particularly refractory ores or compounds of a metal by means of a thermo reducing agent mixed therewith, the reduction taking place when requisite temperature and heat conditions are obtained in the mixture.

Reductions of the kind referred to are well known and can be carried out in ordinary electric furnaces in which an arc is struck in the furnace, and also in open hearth furnaces where hot gases are the heating medium. Both types of furnaces have advantages and disadvantages for effecting these reductions, the chief difficulty in both classes of furnaces being the difficulty of raising the whole contents of a furnace to, and maintaining the heat and temperature thereof at, a state necessary for the reduction to be begun and carried out to the end.

By our invention this difficulty can now be overcome, and the whole mass can be quickly raised to the reaction temperature and the necessary heat imparted thereto, and these conditions can be maintained as long as reasonably desired. According to this invention metals and alloys are produced by reduction of a reduction mixture with which is incorporated an electrical conductor or primer within a furnace of the type commonly known as a high frequency electric induction furnace, wherein by induction the electrical conductor or primer and hence the contents of the furnace are heated and provide the heat and temperature necessary to begin and support or maintain the reaction.

One operation of the invention may be exemplified by describing a reduction of chromite ore as carried out according to the invention.

In effecting such a reduction a mixture of chromite ore and ferrosilicon as a reducing agent in the proportions necessary to effect a reduction is made, and the mixture is put say in a crucible into a high frequency induction zone. A conductor must be provided in the furnace in a suitable form and it may be that the mixture itself incorporates or includes such a conductor or primer, which will be satisfactory. If not, conductors or primers must be used and may be in the form of filings, turnings, rods or bars, sheets or grids, tubes, cylinders, linings, plates or rings or residual metal from a previous heat may be sufficient.

In this specification the word "primer" is used to denote a material, which under the influence of the electric field will achieve a temperature sufficient to start and if need be support the reduction, and the word is to be read in the singular and in the plural.

When the furnace is put in operation, the conductor or primer will be heated by induction and will transmit heat to the contents and when the necessary conditions of heat and temperature are obtained the reaction will take place. From this reaction there results metal and slag, the former with the primers continues to be affected by the electric field, the molten slag cannot be maintained molten by the electric field, but by this time a separation has occurred of the molten metallic contents by gravity from the molten slag and while the slag solidifies the metal collects below it and being under the influence of and still heated by the electric field at the bottom of the furnace accumulates in a clean lump the shape of the bottom of the pot.

As this process applies to various ores and reducing agents, and as different mixtures have different conditions necessary to reduction, it may be desirable to use an energetically reacting mixture mixed with one less energetic, or layers of different mixtures may be arranged in the crucible whereby the less energetic mixture may be assisted by the more energetic and the reduction through the whole mass may be carried out.

As a further example of effecting such a reduction a mixture of iron ore and carbon as a reducing agent is made in the proportions necessary to effect a reduction, and the mixture is put say in a crucible into a high frequency induction furnace. Primers are provided in the furnace in a suitable form such as plates or discs, alternating with layers of the mixture.

When the furnace is put in operation, the primers will be heated and will heat the mixture, and when the necessary conditions of heat and temperature are obtained in the mixture, the reaction will begin and the mass of mixture starts to divide into metal and slag, and until the reduction is complete, reducible substances and reduced metal are included in the slag as it forms. Owing however to the special nature of the furnace, that is to say, owing to the high frequency field, metal in the furnace is always influenced by and therefore heated when in the zone of the field, and thus the separation of the metal is promoted expeditiously from the molten slag. As soon as the metal has separated from the slag, the latter rapidly sets.

Experiments we have made have shown that we have to proportion the size and shape of the pot to the electric frequency and power available, and to the material of which the primers are made, and the materials of the reaction mixture employed, so that the reduction is carried out in a sufficiently intense electric field to raise the primer to at least a reacting temperature, e. g. in the case of a reduction of chromium oxide by silicon to a temperature of 1400° to 1500° C. or thereabouts, or as known in the art.

It will be understood that a certain amount of electric current is needed to heat up the mass and this takes time as some heat is inevitably lost e. g. to the pot. In order to provide for a quicker and more expeditious use of the furnace, thus saving time and current, a number of pots can be charged and heated say in a muffle so that when placed in the electric furnace they are already heated up to a red heat and thus relieve the electric furnace of this duty.

It will also be understood that the primers or priming materials will be chosen so that they will not contaminate the final alloy or metal, but will contribute to the alloy or metal, for instance if a nickel chrome alloy is being made it will be desirable to use nickel chrome primers; this however will be a matter within the knowledge of the melter.

It is pointed out that in this specification the term "exothermic reduction" has been used, but this term is not used in a strict technical sense. Owing to the novel method of operating this process it is possible that both so-called exo-thermic and endo-thermic reductions take place together, separately, or at different times in a single operation, in degree indeterminate.

What we claim as our invention and desire to secure by Letters Patent is—

1. Process of reducing refractory compounds of metals which comprises forming a mixture containing said compounds together with a reducing agent and subdivided electrically conductive material, subjecting the mixture to the action of a high frequency alternating electrical field of sufficient intensity to raise said mixture to the temperature required to initiate and maintain the reaction between the compounds and the reducing agent, and maintaining the heating after the reaction is complete for sufficient time to allow the slag to separate and cool below the temperature of the molten metal.

2. Process of reducing a refractory ore by reaction with a refractory reducing agent which comprises forming a mixture of the ore with the reducing agent in substantially the reactive proportions, placing said mixture together with subdivided electrically conductive material in a suitable high frequency electrical induction coreless type furnace, heating the contents of the furnace at least sufficiently to cause the ore and reducing agent to react, and maintaining the heating after the reaction is complete for a sufficient time to allow the slag to separate and cool below the temperature of the molten metal.

3. Process of producing metals and alloys from refractory ores by reduction in a high frequency electrical induction furnace which comprises forming a mixture containing one or more of said ores, one or more reducing agents in substantially the total amount required to reduce completely said ores by reaction therewith, and a subdivided material having good electrical conductivity, heating said mixture in a high frequency electrical induction furnace at such temperature as is necessary to initiate and maintain the reaction of the components of the mixture, and maintaining the heating after the reaction is complete for sufficient time to allow the slag to separate and cool below the temperature of the molten metal.

4. Process of reducing chromite ore with ferro-silicon which comprises forming a mixture of ore and ferro-silicon in substantially the proportions necessary to effect a complete reaction, placing the mixture together with an electrically conductive subdivided material in a refractory container, heating said container in a muffle furnace to an elevated temperature below that required to start the reaction of the components of the mixture, transferring the container and its contents to a suitable high frequency electrical induction furnace, and subjecting said container and its contents to the action of a high frequency alternating electric field, whereby the reduction is effected and a separation of the metal from the slag is secured.

In testimony whereof we have signed our names to this specification.

WALTER BIRKETT HAMILTON.
THOMAS ALLEN EVANS.